(12) United States Patent
Gross et al.

(10) Patent No.: US 8,918,416 B1
(45) Date of Patent: Dec. 23, 2014

(54) CLASSIFYING QUERIES

(71) Applicant: Google Inc., Mountain View, CA (US)

(72) Inventors: Erik Gross, Palo Alto, CA (US); Myles Sussman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/622,985

(22) Filed: Sep. 19, 2012

(51) Int. Cl.
*G06F 17/30* (2006.01)

(52) U.S. Cl.
USPC .......................................... 707/765; 707/740

(58) Field of Classification Search
CPC ................ G06F 17/30442; G06F 17/30448; G06F 17/3071; G06F 17/2264; G06F 17/3002
USPC ........... 707/706, 713, 759, E17.017, 765, 740
See application file for complete search history.

(56) References Cited

U.S. PATENT DOCUMENTS

2005/0055341 A1* 3/2005 Haahr et al. ...................... 707/3
2011/0131205 A1* 6/2011 Iyer et al. ...................... 707/728

OTHER PUBLICATIONS

Huang et al. 2009 ACM 978-1-60558-512-3/09/11, "Analyzing and Evaluating Query Reformulation Strategies in Web Search Logs".*

Huang et al.,"Analyzing and Evaluating Query Reformulation Strategies in Web Search Logs", 2009 ACM 978-1-60558-512-3/09/11, pp. 77-86.*
Jansen et al., "Determining the informational, navigational, and transactional intent of Web queries," Information Processing and Management 44, 2008, pp. 1251-1266.

* cited by examiner

*Primary Examiner* — Rehana Perveen
*Assistant Examiner* — Alexander Khong
(74) *Attorney, Agent, or Firm* — Fish & Richardson P.C.

(57) ABSTRACT

Methods, systems, and apparatus, including computer programs encoded on computer storage media, for classifying queries. One of the methods includes the actions of obtaining a collection of search queries; for each query in the collection of search queries, determining whether other queries in the collection of search queries are refinements of the query, wherein the refinements of each query include the query terms and one or more additional terms not found in the query; determining a similarity between query pairs from the collection, wherein the similarity between a query pair is determined using the additional query terms from the refinements of the respective search queries of the query pair; obtaining a classified sample group of search queries using a plurality of category labels; and classifying each other search query of the collection of search queries having one or more refinements.

27 Claims, 2 Drawing Sheets

CLASSIFYING QUERIES

BACKGROUND

This specification relates to classifying queries.

Internet search engines aim to identify resources, e.g., web pages, images, text documents, multimedia context, that are relevant to a user's needs and to present information about the resources in a manner that is most useful to the user. Internet search engines return a set of search results in response to a user submitted query. Conventionally, each search result identifies a particular resource responsive to the query. If a user is dissatisfied with the search results returned for a query, the user can attempt to refine the original query to better match the user's needs.

SUMMARY

Queries can be classified with one or more category labels. In particular, a collection of queries can be obtained. For each search query in the collection, a system can determine whether one or more other queries in the collection are refinements of the query. A query refinement includes the query terms and one or more additional terms. The system can then determine a similarity between pairs of queries using the refinement terms, referred to as meta-terms for the query. A sampling of the queries is manually classified by users. The manually classified queries are then used to extend the classification to similar queries in the collection of queries.

In general, one innovative aspect of the subject matter described in this specification can be embodied in methods that include the actions of obtaining a collection of search queries; for each query in the collection of search queries, determining whether other queries in the collection of search queries are refinements of the query, wherein the refinements of each query include the query terms and one or more additional terms not found in the query; determining a similarity between query pairs from the collection, wherein the similarity between a query pair is determined using the additional query terms from the refinements of the respective search queries of the query pair; obtaining a classified sample group of search queries using a plurality of category labels; and classifying each other search query of the collection of search queries having one or more refinements using the plurality of category labels based on the classified sample group of search queries and the determined similarity. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method further includes classifying unrefined search queries of the collection of search queries that do not have a refinement including propagating one or more category labels from the classified search queries. The propagating includes, for a given classified search query, identifying a non-refined search query sharing one or more terms in common with the given classified search query. Determining the similarity between a query pair includes calculating a distance metric between two search queries of the pair. The distance metric is based on a word-vector cosine similarity. The distance metric is weighted using a term frequency-inverse document frequency score for each query, wherein the term frequency-inverse document frequency score is based on the frequency of the additional terms of the query refinement. Classifying each other search query having one or more refinements using the determined similarity includes determining, for each other search query, one or more nearest sample queries and applying the labels of the one or more nearest sample queries. The collection of search queries is aggregated too determine a single instance for each search query. The collection of search queries corresponds to search queries submitted over a specified time period. Classifying a particular search query of the other search queries having one or more refinements includes identifying a specified number of classified search queries of the classified sample group of search queries that have a greatest similarity to the particular search query and using the specified number of classified search queries to determine the classification of the particular search query.

Particular embodiments of the subject matter described in this specification can be implemented so as to realize one or more of the following advantages. Classifying queries can provide an improvement in search results provided in response to a received query. For example, the classification of a user submitted query can be used to identify relevant resources associated with that classification. Classified queries can be used to provide specialize content in response to certain types of queries, for example, to provide specialized content within the same category as the query. The classified queries can be used to improve advertising as particular classes of queries may be better for certain types of advertisements. The classified queries can also be used to improve ranking for search results responsive to the queries based on different ranking criteria for different classes of queries. Search result filtering, e.g., "safe search," may be improved based on the level of filtering applied to particular classes of queries.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
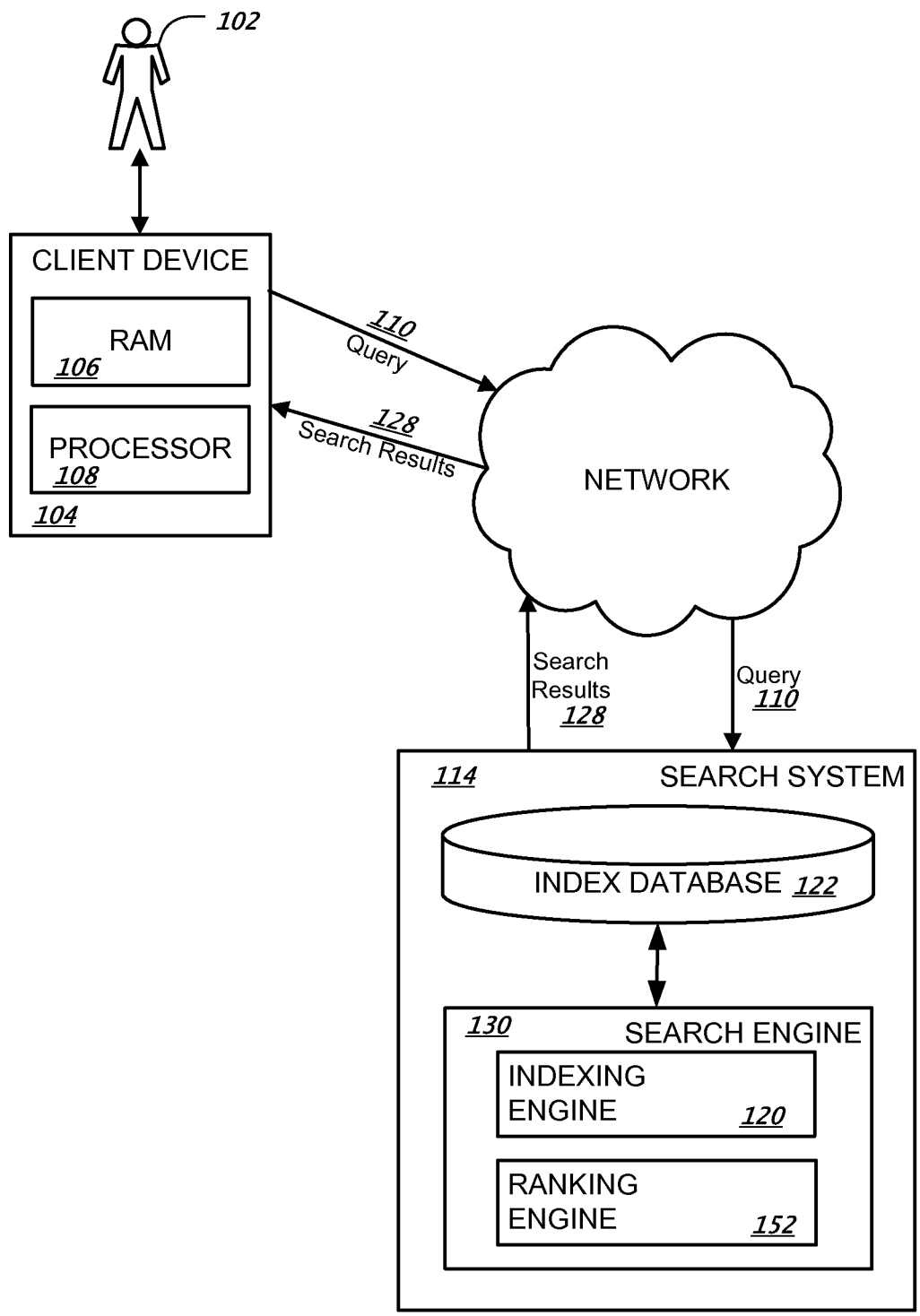
FIG. 1 shows an example search system.

FIG. 1 shows an example search system 114 for providing search results relevant to submitted queries as can be implemented in an internet, an intranet, or another client and server environment. The search system 114 is an example of an information retrieval system in which the systems, components, and techniques described below can be implemented.

A user 1002 can interact with the search system 114 through a client device 104. For example, the client 104 can be a computer coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

A user 102 can submit a query 110 to a search engine 130 within a search system 114. When the user 102 submits a query 110, the query 110 is transmitted through a network to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102, e.g., as a search results web page to be displayed in a web browser running on the client device 104.

When the query 110 is received by the search engine 130, the search engine 130 identifies resources that match the query 110. The search engine 130 can determine a category label associated with the received query, for example, using an index of classified queries. The search engine 130 will generally include an indexing engine 120 that indexes resources, e.g., web pages, images, or news articles on the Internet, found in a corpus, e.g., a collection or repository of content, an index database 122 that stores the index information, and a ranking engine 152, or other software, to rank the resources that match the query 110. The indexing and ranking of the resources can be performed using conventional techniques. The category label of the query 110 can be used in identifying resources. For example, indexed resources can include an associated category label that can be used as a factor in ranking resources that match the query. The search engine 130 can transmit the search results 1028 through the network to the client device 104 for presentation to the user 102.

Figure 2:
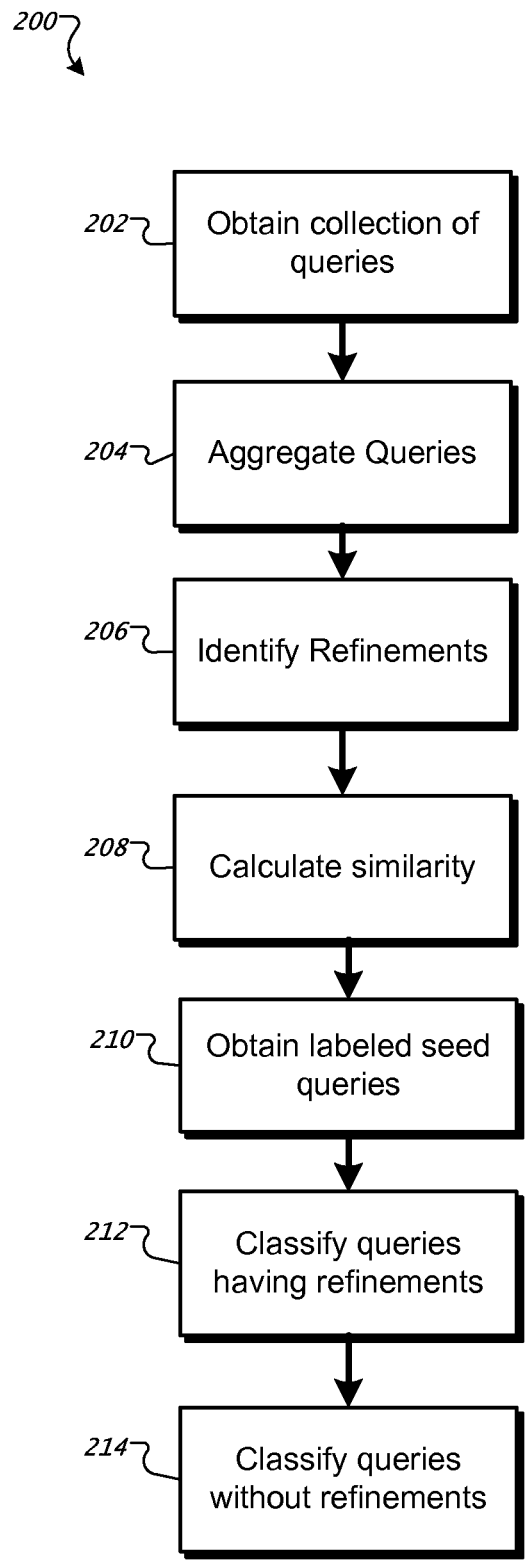
FIG. 2 is a flow diagram of an example method for classifying queries.

FIG. 2 is a flow diagram of an example method 200 for classifying queries. For convenience, the method 200 will be described with respect to a system 200 that performs the method 200.

The system obtains a collection of search queries (202). The collection of search queries can be obtained, for example, from one or more search query logs for a search system. The collection of search queries can include queries submitted by multiple users to the search system over a specified period of time. For example, the collection of search queries can include search queries submitted over a one year, two years, six months, and so on. In some implementations, the collection of search queries is specific to one or more geographic regions, e.g., countries, states, metro areas, or other geographic regions. Thus, for example, the collection of search queries can include search queries submitted over the past year in the United States.

In some implementations, the system processes the search queries in the collection of search queries, for example, to correct spelling errors, to remove punctuation, or to remove stop words. Additionally, in some other implementations, filters are applied to remove particular types of queries, for example, porn queries.

The system aggregates queries in the collection of search queries (204). The collection of search queries can include repeated queries, e.g., identical search queries that have been submitted to the search system by one or more users within the specified period of time. The aggregation removes duplicate search queries such that only a single instance of each unique search query is maintained in the collection of search queries. For example, if the search query "California State Fair" occurs 1000 times, the aggregation retains one instance of "California State Fair" as well as a count of the number of times the search query occurred. The system can also store a count of each instance such that the frequency of each query prior to aggregation is recorded. In some implementations, the collection of search queries is stored a as a table of search queries and corresponding frequencies. In some other implementations, variants of the same query are aggregated in addition to search queries that are identical. For example, differences in spelling can be identified and treated as the same query. In another example, abbreviations can be combined with the full length query that is otherwise identical. For example, "California State Fair" can be combined with "CA State Fair."

The system identifies query refinements (206). Each search query includes one or more terms. A term can be a word or a phrase of one or more words. A refinement of a search query includes all of the terms of a given query as well as one or more additional terms. For example, the search query can be a music group named "Petrichor." The search query can also be associated with query refinements "Petrichor lyrics" or "Petrichor concerts."

For each search query Q, all refinements $R_1 \ldots R_N$ are identified from the collection of search queries, or in particular, the aggregated collection of search queries. The additional terms found in each query refinement are referred to as meta-terms associated with the search query. For example, if the search query is "Petrichor," the associated meta-terms can include "lyrics, concert schedule, band, songs, album." Each meta-term can also have an associated frequency indicating the number of occurrences of the meta-term in refinements of the search query. In some implementations, the frequency is used to calculate a weight relative to the other queries in the collection of queries, for example, a term frequency-inverse document frequency weight as described below. Thus, the collection of search queries can be processed to provide a collection of search queries and their associated refinement meta-terms, if any.

The system calculates similarity between pairs of search queries (208). In particular, the meta-terms for search queries are used to calculate the similarity between pairs of search queries. Various techniques can be used to calculate the similarity between pairs of search queries. In some implementations, a distance metric is used wherein the "distance" between the search queries indicates the degree of similarity. Thus, the shorter the distance between a pair of queries, the more similarity exists between the queries. In some implementations, the system uses a word-vector cosine similarity as the distance metric for calculating similarity. As such, each search query is represented by a weighted vector of terms including the meta-terms for the search query.

The weight can be based on the term frequency-inverse document frequency (tf-idf) weight of each query term and meta-term. Generally, the tf-idf weight is a numerical statistic that reflects how important a word is to a document in a collection. The tf-idf value increases proportionally to the number of times a word appears in the document, but is offset by the frequency of the word in the collection. This helps control for some words generally being more common than others. Thus, the frequency of each term in the collection of search queries as well as the number of search queries is used to calculate a tf-idf weight for each term.

For example, given the following queries and their respective meta-terms:

Query A: Petrichor→lyrics, concert schedule, band, songs, album

Query B: Soundbucket→lyrics, songs, album, music

Query C: John Smith→albums, instrument, guitar

Query D: Tuberculosis→symptoms, diagnosis, antibiotics, xray

Each meta-term can also have a corresponding tf-idf weight.

Using the distance metric, it can be determined that "Petrichor" and "Soundbucket" are similar queries. For example, because of the shared meta-terms and the respective weights of the meta-terms, the system can calculate the distance between the two search queries. "John Smith" e.g., a musician's name, is somewhat similar to the bands "Petrichor" and "Soundbucket." In addition to calculating distance, one or more distance thresholds can be determined for establishing similarity between a given pair of queries. If the distance between a pair of queries satisfies the threshold, they can be considered sufficiently similar, for example, to infer they belong to the same category as described in greater detail below.

"Tuberculosis" is not related to any of the other three search queries, for example, because there are no shared meta-terms, the distance calculation can result in a large amount of distance between the search queries. In such a manner, the similarity can be calculated between each pair of refined search queries in the collection of search queries. Alternatively, for each query a global search of the collection of queries can be performed to identify the closest, i.e., most similar, query or queries.

The system obtains a group of manually labeled seed queries (210). In particular, a group of sample search queries are selected from the collection of search queries. The sample search queries can be selected to provide an assortment of queries that span the breadth of collection of search queries. In some implementations, the group of sample search queries is limited to those search queries in the collection of search queries identified as having refinements. The group of sample search queries can be selected based on a popularity measure, for example, a specified number of most popular search queries among the collection of search queries. In some alternative implementations, search queries can be selected at random, e.g., according to a random or pseudo random number generator. Alternatively, the sample search queries can be obtained from a previously classified group of search queries.

One or more human users then apply one or more category labels to each of the sample search queries from a specified collection of category labels. The collection of category labels can be obtained, for example, from an existing category hierarchy. For example, if the sample query is "Petrichor concert schedule" the human user can apply the label [class: music]. In some implementations, the human users apply one or more labels in increasing specificity. For example, labels designating a general category and one or more specific subcategories, e.g., [class: music]; [subclass: musical groups].

In some implementations, weights for the labeled search queries are modified, e.g., the tf-idf weights for the respective terms of the labeled search queries. In particular, search queries assigned the same label can be modified so that the distance between the search queries is smaller. In some other implementations, dissimilar labeled search queries can be modified to increase the distance between them. Thus, members of the same class will have smaller distances between them while members of different classes should have larger distances between them. For example, for two queries that were labeled as automotive, the terms "horsepower" and "mpg" may get large weights because they were in common, and rarely appeared in other labels. By contrast the terms "picture" or "msrp" would get lower weights, because— although they were common refinements of automotive queries, they were also common terms in other classes of queries.

Different optimization techniques can be performed to move similar search queries together and dissimilar search queries apart.

The system classifies the search queries in the collection of search queries having query refinements (212). In particular, the system applies one or more category labels to search queries having query refinements. To classify each search query, the system uses the category labels assigned to each of the sample search queries and the calculated similarity, e.g., distance between queries, to identify one or more nearest queries for each of the labeled sample queries.

In some implementations, for a search query to be classified, the system identifies a specified number of classified search queries that are closest to the search query to be classified. For example, the system can identify five nearest search queries from already classified search queries, e.g., the manual labeled sample search queries or other classified queries. Nearest queries can be based on the distance metric described above. The five closest classified search queries are then used to determine the classification of the search query to be classified.

In some implementations, the labeled categories of the nearest search queries are used to vote on the classification to determine a consensus label apply to the search query. For example, for five nearest search queries, the label that occurs most often can be assigned to the search query as the winning classification. A confidence measure can be assigned based on the winning share of labels. For example, if four out of five nearest search queries are labeled as having "music" classification, the confidence measure can be 4/5 or 80%.

In some other implementations, the five nearest search queries are weighted based on how close they are to the search query being classified. Thus, a very similar search query, e.g., very close distance metric, would have more label voting power than a distant search query even though both were in the specified number of closest search queries. The weighted votes could be summed to obtain a confidence measure.

Consequently, the system infers classification of search queries based on similarity between terms and associated meta-terms of each. For example, if the search query "Petrichor" having meta-terms "lyrics, concert schedule, band, songs, album" is manually classified as [class: music], then other queries having a high similarity, i.e., shortest distance, to the search query "Petrichor" can be inferred to also belong to [class: music]. For example, the search query "soundbucket" having meta-terms "lyrics, songs, album, music" can have a calculated distance from "Petrichor," using the similarity measure, that satisfies a specified threshold distance. Consequently, the search query "soundbucket" and the associated refined queries are each labeled [class: music]. Alternatively, the system can consider each manually labeled sample query and identify each other refined query in the collection that has satisfies a threshold similarity, i.e., a threshold nearness, to the already labeled sample query?

The system optionally classifies the search queries in the collection of search queries that do not have query refinements (214). To classify search queries without refinements, the system propagates labels down from classified search queries of the collection of search queries. For example, the classified query "Petrichor"=[class: music] implies that the non-refined search query "Who opened for Petrichor in 1998"=[class: music]. More specifically, if "Petrichor" is the original query, "who opened for Petrichor" is a refinement of "Petrichor." The query "who opened for Petrichor in 1998" is also a refinement of "Petrichor" and is also a refinement of "who opened for Petrichor." Both refinements can be classified with the same label as the original query "Petrichor." Further, this may allow for the labeling of queries that have not been previously observed.

Once the search queries have been classified, the system can store them, for example, in a database or as entries in an index. In some implementations, a search index is annotated with the classifications. A search system can then use the classification in identifying search results in response to a received query. For example, the classification of a user submitted query can be used to identify relevant resources associated with that classification. Classified queries can be used to provide specialize content in response to certain types of queries, for example, to provide specialized content within the same category as the query. The classified queries can be used to provide advertising where particular classes of queries may be better suited for providing certain types of advertisements. The classified queries can also be used as a factor in ranking search results responsive to the queries, for example, based on different ranking criteria for different classes of queries.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining a collection of search queries;
    for each query in the collection of search queries, determining whether other queries in the collection of search queries are refinements of the query, wherein the refinements of each query include the query terms and one or more additional terms not found in the query; and
    for a group of queries determined to have one or more refinements:
        determining a similarity between pairs of queries in the group, wherein the similarity between a given query pair is determined using the additional query terms from the refinements of the respective search queries of the query pair;
        obtaining a sample group of labeled search queries from the group of queries determined to have one or more refinements, wherein each labeled search query in the sample group includes a corresponding category label that was previously assigned to the search query from a collection of category labels; and
        classifying each search query of the group of queries determined to have one or more refinements with one or more of the category labels including, for each search query:
            using the determined similarity between pairs of queries in the group to determine a specified number of labeled search queries in the sample group that are nearest to the query according to a distance metric, and
            using the nearest labeled search queries to determine the classification of the search query.

2. The method of claim 1, further comprising:
    classifying un-refined queries of the collection of search queries that do not have a refinement including propagating one or more category labels from the classified search queries.

3. The method of claim 2, wherein the propagating includes, for a given classified search query, identifying a non-refined search query sharing one or more terms in common with the given classified search query.

4. The method of claim 1, wherein determining the similarity between a query pair includes calculating a particular distance metric between the two search queries of the query pair.

5. The method of claim 4, wherein the distance metric is based on a word-vector cosine similarity.

6. The method of claim 4, wherein the distance metric is weighted using a term frequency-inverse document frequency score for each query, wherein the term frequency-inverse document frequency score is based on the frequency of the additional terms of the query refinement.

7. The method of claim 1, wherein using the nearest labeled search queries to determine the classification of the search query includes applying a consensus label using the labels of the specified number of nearest labeled search queries.

8. The method of claim 1, wherein the collection of search queries is aggregated to determine a single instance for each query.

9. The method of claim 1, wherein classifying a particular search query of the other search queries having one or more refinements includes identifying a specified number of classified search queries of the classified sample group of search queries that have a greatest similarity to the particular search query and using the specified number of classified search queries to determine the classification of the particular search query.

10. A system comprising:
    one or more computers configured to perform operations comprising:
        obtaining a collection of search queries;
        for each query in the collection of search queries, determining whether other queries in the collection of search queries are refinements of the query, wherein the refinements of each query include the query terms and one or more additional terms not found in the query; and
        for a group of queries determined to have one or more refinements:
            determining a similarity between pairs of queries in the group, wherein the similarity between a given query pair is determined using the additional query terms from the refinements of the respective search queries of the query pair;
            obtaining a sample group of labeled search queries from the group of queries determined to have one or more refinements, wherein each labeled search query in the sample group includes a corresponding category label that was previously assigned to the search query from a collection of category labels; and classifying each search query of the group of queries determined to have one or more refinements with one or more of the category labels including, for each search query:

using the determined similarity between pairs of queries in the group to determine a specified number of labeled search queries in the sample group that are nearest to the query according to a distance metric, and using the nearest labeled search queries to determine the classification of the search query.

11. The system of claim 10, further comprising:
classifying un-refined search queries of the collection of search queries that do not have a refinement including propagating one or more category labels from the classified search queries.

12. The system of claim 11, wherein the propagating includes, for a given classified query, identifying a non-refined search query sharing one or more terms in common with the given classified search query.

13. The system of claim 10, wherein determining the similarity between a query pair includes calculating a particular distance metric between the two search queries of the pair.

14. The system of claim 13, wherein the distance metric is based on a word-vector cosine similarity.

15. The system of claim 13, wherein the distance metric is weighted using a term frequency-inverse document frequency score for each query, wherein the term frequency-inverse document frequency score is based on the frequency of the additional terms of the query refinement.

16. The system of claim 10, wherein using the nearest labeled search queries to determine the classification of the search query includes applying a consensus label using the labels of the specified number of nearest labeled search queries.

17. The system of claim 10, wherein the collection of search queries is aggregated to determine a single instance for each query.

18. The system of claim 10, wherein classifying a particular search query of the other search queries having one or more refinements includes identifying a specified number of classified search queries of the classified sample group of search queries that have a greatest similarity to the particular search query and using the specified number of classified search queries to determine the classification of the particular search query.

19. A non-transitory computer storage medium encoded with a computer program, the program comprising instructions that when executed by one or more computers cause the one or more computers to perform operations comprising:

obtaining a collection of search queries;

for each query in the collection of search queries, determining whether other queries in the collection of search queries are refinements of the query, wherein the refinements of each query include the query terms and one or more additional terms not found in the query; and for a group of queries determined to have one or more refinements:

determining a similarity between pairs of queries in the group, wherein the similarity between a given query pair is determined using the additional query terms from the refinements of the respective search queries of the query pair;

obtaining a sample group of labeled search queries from the group of queries determined to have one or more refinements, wherein each labeled search query in the sample group includes a corresponding category label that was previously assigned to the search query from a collection of category labels; and classifying each search query of the group of queries determined to have one or more refinements with one or more of the category labels including, for each search query:

using the determined similarity between pairs of queries in the group to determine a specified number of labeled search queries in the sample group that are nearest to the query according to a distance metric, and using the nearest labeled search queries to determine the classification of the search query.

20. The non-transitory computer storage media of claim 19, further comprising:
classifying un-refined search queries of the collection of search queries that do not have a refinement including propagating one or more category labels from the classified search queries.

21. The non-transitory computer storage media of claim 20, wherein the propagating includes, for a given classified search query, identifying a non-refined query sharing one or more terms in common with the given classified search query.

22. The non-transitory computer storage media of claim 19, wherein determining the similarity between a query pair includes calculating a particular distance metric between the two search queries of the pair.

23. The non-transitory computer storage media of claim 22, wherein the distance metric is based on a word-vector cosine similarity.

24. The non-transitory computer storage media of claim 22, wherein the distance metric is weighted using a term frequency-inverse document frequency score for each query, wherein the term frequency-inverse document frequency score is based on the frequency of the additional terms of the query refinement.

25. The non-transitory computer storage media of claim 19, wherein using the nearest labeled search queries to determine the classification of the search query includes applying a consensus label using the labels of the specified number of nearest labeled search queries.

26. The non-transitory computer storage media of claim 19, wherein the collection of search queries is aggregated to determine a single instance for each query.

27. The non-transitory computer storage media of claim 19, wherein classifying a particular search query of the other search queries having one or more refinements includes identifying a specified number of classified search queries of the classified sample group of search queries that have a greatest similarity to the particular search query and using the specified number of classified search queries to determine the classification of the particular search query.

* * * * *